2,965,678
POLYOXYETHYLENE ETHERS OF BRANCHED CHAIN ALCOHOLS

Robert L. Sundberg, Alpha, and James Martin Cross, Belvidere, N.J., assignors to General Aniline & Film Corporation, New York, N.Y., a corporation of Delaware No Drawing. Filed Dec. 28, 1951, Ser. No. 263,976

7 Claims. (Cl. 260—615)

This invention relates to the production of oxyalkyl derivatives of branched chain alcohols and more particularly to oxyalkyl derivatives of long chain primary aliphatic alcohols containing at least two side chains.

It is an object of this invention to provide wetting agents and detergents from branched chain alcohols. Another object is the provision of novel oxyalkyl derivatives with improved properties. Other objects and advantages will appear as the description proceeds.

The aforementioned objects are obtained by the instant invention which is directed to compounds which may be obtained by condensing from about 1 to 9 moles of ethylene oxide or propylene oxide with 1 mole of a primary aliphatic alcohol of about 10 to 20 carbon atoms containing a plurality of side chains.

Thus, the compounds of the present invention may be illustrated by the following formula:

$$R-O(CH_2CHO)_n-H$$
$$\phantom{R-O(CH_2C}|$$
$$\phantom{R-O(CH_2CH}X$$

wherein R is an alkyl group of 10 to 20 carbon atoms containing more than 2 side chains, X is H or $CH_3$, and $n$ is from 1 to 9.

Branched chain primary aliphatic alcohols which may be used are 2,4,5,5,7-pentamethyl-1-octanol, 2,3,5,7-tetramethyl-1-nonanol, 2,4,7-trimethyl-1-nonanol, 2,4,5,6,8-pentamethyl-1-nonanol, 2,6,7-trimethyl-3-ethyl-1-octanol, 2,4,6,8-tetramethyl-1-nonanol, 2,3,5-trimethyl-4,7-diethyl-1-octanol, 2,3,5,6-tetramethyl-5,7-diethyl-1-octanol, 3,5-dimethyl-4,6-diethyl-1-heptanol, 3,4,5-trimethyl-9,6-diethyl-1-heptanol, 2-ethyl-3,5,7-trimethyl-1-octanol, 2-ethyl-4,6-dimethyl-1-octanol, 2,5,7,7-tetramethyl-1-octanol, 3,5,7,7-tetramethyl-1-octanol, 2,5-diethyl-3,7-dimethyl-1-octanol, and 2,5,7,9-tetramethyl-1-decanol. Preferably alcohols may be used which are prepared by the catalytic reaction of an olefin such as tripropylene, tetrapropylene, pentapropylene, triisobutylene, tetraisobutylene, tributene, 4,6,8-trimethyl-1-nonene, 4,6,8-trimethyl-2-nonene, mixed propene-butene polymers, 5,7,7-trimethyl-1-octene, 3,5,7-trimethyl-1-heptene, and 2,4,6,6,8-pentamethyl-1-nonene, with carbon monoxide and hydrogen to form an aldehyde followed by catalytic reduction of this aldehyde to an alcohol. This two stage process is known as the OXO process. This process always results in a major proportion of branched chain products according to Storch, Golumbic, and Anderson; ("The Fischer-Tropsch and Related Syntheses," chapter 5, page 441, John Wiley and Sons, New York, 1951). According to this work, even straight chain 1-olefins react in two ways in the first step of the OXO process giving rise to branched chain products. In the presence of a catalyst such as a reactive salt of cobalt, the olefin may add carbon monoxide and hydrogen according to the following scheme:

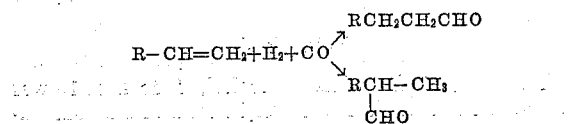

The olefin also readily isomerizes in the presence of the OXO catalyst and thus greatly increases the chances for branching in the final alcohol:

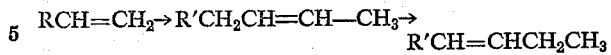

The following branched chain alcohols would be produced from these olefins:

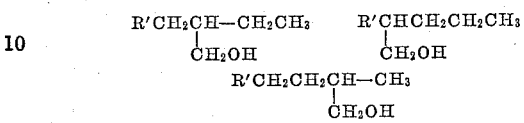

It can be seen that when the olefin has a branched chain structure to start with, there will be two or more points of branching in the final alcohol.

The starting alcohols employed in producing the compounds of this invention may be condensed with the required number of moles of ethylene oxide or propylene oxide or a mixture of the two oxides in known manner. The condensation is preferably carried out under raised temperatures and pressures and may be catalyzed by quaternary hydroxides, amines, or acidic and coordinating type compounds, although the strong alkaline catalysts such as KOH or NaOH and the like are preferred because of the fewer by-products formed and the more easily controllable reaction conditions.

While it is presumed that in the case of propylene oxide, products of type I below are formed, especially when using an alkaline catalyst, it is realized that some type II products may also be formed. This is particularly true when the reaction is carred out using an acidic catalyst (e.g. $BF_3$, $H_2SO_4$):

Type I

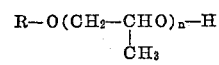

Type II

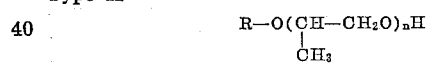

General methods for carrying out the oxyalkylation reaction are illustrated in U.S. Patents 1,970,578 and 2,174,761.

The compounds of this invention have been found to be novel in that their surfactant properties differ to a large degree from products of the same type derived from straight chain aliphatic alcohols. This may be seen by a study of the wetting values in the following table. Except where otherwise indicated, the values given are for the 25 second wetting concentration (in g./l.) from the Draves wetting tests.

TABLE

| Alcohol Structure | Reaction Product of Example No. | Wt. Ratio of Ethylene Oxide to Alcohol | Cloud Point of 6 Drops/ 10 cc. $H_2O$, °C. | Draves Wetting Test Results, g./liter |
|---|---|---|---|---|
| Straight Chain $C_{12}$ | 4 | 1.65 | 55 | 0.52 |
| Branched Chain $C_{13}$ | 2 | 1.86 | 51 | 0.36 |
| Straight Chain $C_{14}$ | 5 | 1.4 | 50 | 0.64 |
| Straight Chain $C_{16}$ | 6 | 1.68 | [1] 64 | 3.0 |
| Branched Chain | 3 | 1.02 | 57 | 1.0 |

[1] Above.

The amount of ethylene oxide (or propylene oxide) added will determine the application of the product. For example, two to seven moles ethylene oxide on OXO tridecyl alcohol gives products which are valuable emulsifiers for mineral and vegetable oils. When more ethylene oxide is added (for example, eight to nine moles) valuable emulsifiers for DDT in xylene or Velsicol (alkylated naphthalenes) are obtained. In addition, products in this range of water solubility have unusually good wetting efficiency by the Draves test and are very useful as a dishwashing agent and detergent. The product formed by treating OXO tridecyl alcohol with 8-9 moles ethylene oxide (preferably, 8.5) has unusually efficient action.

Two important properties of these new products are their excellent chemical stability and their great activity at surfaces and interfaces which promotes their use in a large field of the technical arts. For instance, they can be used as wetting, frothing, or washing agents in the treating and refining of textiles; for converting liquid or solid substances which per se are insoluble in water (such as hydrocarbons, higher alcohols, oils, fats, waxes and resins) into clear solutions, creamy emulsions or fine, stable dispersions; for carbonizing; for dyeing; for the pasting of dyestuffs; for fulling, sizing, impregnating and bleaching treatments; as cleansing agents in hard water; for dyeing in "padding" liquors; in tanning and mordanting processes; for dyeing acetate silk with insoluble dyestuffs; as emulsifying agents; for the preparation of dyestuffs in finely divided form; for the cleansing of vegetable fibers; for producing foam in fire extinguishers; as a means for improving the absorptive power of fibrous bodies; and as an aid in softening baths for hides and skins.

In addition, these products are valuable emulsifiers for insecticide compositions and agricultural sprays such as 2,4-D, toxaphene, chlordane, dormant or mineral oil sprays, nicotine sulfate, Dieldrin, Aldrin, Lindane, BHC, Heptachlor, I.P.C., chloro I.P.C., Methoxychlor, etc.

These products are valuable for use in the petroleum industry as additives for fuel oils, hydraulic fluids, lubricating oils, cutting oils, greases as additives to the water or brine used for oil recovery from oil-bearing strata by flooding techniques.

Other valuable uses are in metal cleaning compositions, dry cleaning compositions, additives for rubber latices, froth flotation agents, additives for road building materials such as air entraining agents for concrete or cement, additives to asphalt compositions, plasticizers and modifiers for vinyl plastics, alkyd resins, and other types of polymeric-type plastic materials for incorporation into adhesives, paint, linoleum and the like; for use in bonding agents used in various insulating and building materials; as refining aids in wood digesters to prepare pulp and as additives to pulp slurries in beating operations to prevent foaming and also to aid beating operations.

These products are also useful as emulsifiers for emulsion polymerization, mercerizing assistants, wetting agents, rewetting agents, dispersing agents, detergents, penetrating agents, softening agents, cutting oils, lime soaps, dispersants, corrosion inhibitors, dishwashing agents, antistatic agents, disinfectants, insecticides, mothproofing agents, bacteriocides, fungicides and biocides.

They are valuable as anti-fogging agents for use on glass and other surfaces where the accumulation of an aqueous fog is detrimental. They are useful in the rayon industry as additives to the spinning bath and as aids in clarifying viscose rayon. They are of value in hydraulic fluids to improve viscosity characteristics.

These products are especially useful in breaking petroleum emulsions. They may be used to break emulsions of crude petroleum and salt water as obtained from oil wells, or to prevent water-in-oil emulsions resulting from acidization of oil wells by introducing the agent into the well, or to break or prevent emulsions which would result from a water flooding process for recovering oil from oil-bearing strata. They may also be used to break emulsions encountered in a petroleum refining process.

They are useful as corrosion inhibitors, as rust inhibitors, in the protection of metals, especially ferrous metals, in acid pickling baths, in acid cleaning compositions, and in electro-plating baths.

Other valuable uses are as solvents, as cleaning agents for paint brushes, as additives for paints, varnishes, lacquers and the like, as lubricants, greases and stuffing agents.

These products are valuable in the preparation of skin creams, lotions, salves, and other cosmetic preparations such as home hair-wave sets, shampoos, toothpastes, etc. They may also be of value in food products as foaming agents, emulsifying agents, and softening agents.

This invention may be illustrated by the following examples, which are not to be regarded as limitative.

*Example 1*

Charge.

Into the autoclave: 474 g. (2.366 mols) OXO-tridecyl alcohol ($C_{13}H_{27}OH$ poly branched chain primary aliphatic alcohol prepared from tetrapropylene by the OXO process); 1.9 g. NaOH.

Into an ethylene oxide reservoir: 630 g. (14.32 moles) ethylene oxide.

The OXO-tridecyl alcohol and sodium hydroxide were charged into the autoclave and the autoclave heated to reaction temperatures, 140° C. Ethylene oxide gas was then admitted gradually from the reservoir. The reaction pressure was regulated at 25-30 lb. p.s.i. during the reaction. When absorption was complete, the product was discharged. The total yield of product was 1104 g. This weight of product minus the weight of charged tridecyl alcohol and catalyst equal the amount of ethylene oxide which reacted. These weights are substituted in the formula $$\frac{\text{Wt. EtO reacted} \times 200.4}{\text{Wt. alcohol charged} \times 44} = \text{mole ratio}$$

where 200.4 and 44 are the molecular weights of OXO tridecyl alcohol and ethylene oxide respectively. The mole ratio was 6.0.

The product had a varnish color No. of 3 and a solidification point of 5-6° C. When added to mineral oil and water an excellent emulsion was obtained which showed a high degree of stability. This product gave a 25 second wetting time, using 0.34 g. per liter by the Draves method.

*Example 2*

Fifty grams tridecyl alcohol prepared by the OXO process were treated with 93 g. ethylene oxide gas which was added over a period of 3¼ hours at 15 cm. Hg pressure using sodium hydroxide to catalyze the reaction. The reaction temperature was kept at 150-160° C. When the absorption of ethylene oxide gas was complete the product was discharged.

The amber-colored product showed unusually high wetting strength by the Draves method, and good foam. (See table.)

*Example 3*

98.2 g. OXO hexadecyl (poly branched chain primary aliphatic) alcohol which was prepared by the OXO process were treated with 71.3 g. ethylene oxide at 160-170° C. in the presence of 0.295 g. NaOH.

Fifty grams of the above product were further treated with 51 grams ethylene oxide. The product dissolved in water to a clear solution and had a cloud point of 57° C. when 6 drops were added to 10 cc. water. See table for results.

Upon agitating a mixture of 80 parts by wt. of water, and 5 parts by wt. of DDT dissolved in 14.4 parts by weight of xylene containing 0.6 part by wt. of the above product a superior emulsion resulted particularly in regard to stability when compared to a similar emulsion, using as emulsifier the straight chain product obtained from the reaction of lauryl alcohol and seven moles of ethylene oxide.

*Example 4*

A straight chain primary alcohol, dodecanol-1, was treated as in Example 1 in a weight ratio of ethylene oxide to alcohol of 1.65:1. The properties of the product are set out in the table for comparative purposes.

Example 5

Example 4 was repeated with tetradecanol-1, in a weight ratio of ethylene oxide to alcohol of 1.4:1. See table for results.

Example 6

Example 4 was repeated with hexadecanol-1, in a weight ratio of 1.68:1 of ethylene oxide to alcohol. See table for results.

Example 7

Example 1 was repeated except that equivalent amounts of 1,2-propylene oxide were substituted for the ethylene oxide. The product had good emulsifying properties.

Where a branched chain OXO alcohol is indicated in the foregoing specification, it is to be considered a mixture of OXO alcohols having chain lengths averaging the stipulated values rather than being pure products. However, the major proportion of the mixture of OXO alcohols will have the stipulated chain length.

Various modifications and variations of this invention will be obvious to a worker skilled in the art and it is understood that such modifications and variations are to be include within the purview of this application and the spirit and scope of the appended claims.

We claim:

1. A polyoxyethylene ether of a primary monohydric saturated aliphatic alcohol of about 10 to 20 carbon atoms containing more than two side chains and having the molecular configuration of an alcohol produced by the OXO process from a mono-olefinic hydrocarbon of about 9 to 19 carbon atoms containing at least two side chains, said ether containing 2 to 9 oxyethylene groups per mole.

2. An ether as defined in claim 1 in which said alcohol is a hexadecyl alcohol.

3. An ether as defined in claim 1 in which said alcohol is a tridecyl alcohol.

4. A polyoxyethylene ether of a primary monohydric saturated tridecyl alcohol having the molecular configuration of an alcohol produced by the OXO process from an olefin of the class consisting of triisobutylene and tetrapropylene, said ether containing 2 to 9 oxyethylene groups per mole.

5. An ether as defined in claim 4 in which said olefin is tetrapropylene.

6. An ether as defined in claim 4 in which said olefin is triisobutylene.

7. An ether as defined in claim 4 containing 6 to 8.5 oxyethylene groups.

References Cited in the file of this patent

UNITED STATES PATENTS

| | | |
|---|---|---|
| 1,970,578 | Schoeller et al. | Aug. 21, 1934 |
| 2,226,119 | DeGroote et al. | Dec. 24, 1940 |
| 2,355,823 | Schlegel | Aug. 15, 1944 |
| 2,503,915 | Majewski | Apr. 11, 1950 |
| 2,508,035 | Kosmin | May 16, 1950 |
| 2,508,036 | Kosmin | May 16, 1950 |
| 2,530,989 | Parker | Nov. 21, 1950 |
| 2,934,568 | Barker | Apr. 26, 1960 |

FOREIGN PATENTS

| | | |
|---|---|---|
| 879,689 | France | Nov. 30, 1942 |

OTHER REFERENCES

Jones et al.: Journal of Economic Entomology, vol. 39, No. 6 (December 1946), pages 735–740.

Wender et al.: Bureau of Mines Publication RI 4270, June, 1948, page 25.

Chem. Industries, August 1948, pages 211–212.

UNITED STATES PATENT OFFICE
CERTIFICATION OF CORRECTION

Patent No. 2,965,678                        December 20, 1960

Robert L. Sundberg et al.

It is hereby certified that error appears in the above numbered patent requiring correction and that the said Letters Patent should read as corrected below.

Column 2, line 32, for "carred" read -- carried --; same column, in the Table, first column thereof, under the heading "Alcohol Structure", line 5, for "Branched Chain" read -- Branched Chain $C_{16}$ --; same Table, fourth column thereof, line 4, for "$^{1}$64" read -- 64 --; same Table, fifth column thereof, line 4, for "3.0" read -- above 3.0 --; line 64, footnote to the table, strike out "$^{1}$Above.".

Signed and sealed this 13th day of June 1961.

(SEAL)
Attest:

ERNEST W. SWIDER                        DAVID L. LADD
Attesting Officer                           Commissioner of Patents